(12) United States Patent
Alvarez et al.

(10) Patent No.: US 8,427,959 B2
(45) Date of Patent: Apr. 23, 2013

(54) BANDWIDTH BASED SELECTION FOR ROUTING DATA

(75) Inventors: Daniel A. Alvarez, Pleasanton, CA (US); Toerless Eckert, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 830 days.

(21) Appl. No.: 11/625,552

(22) Filed: Jan. 22, 2007

(65) Prior Publication Data
US 2008/0175269 A1    Jul. 24, 2008

(51) Int. Cl.
*G01R 31/08* (2006.01)

(52) U.S. Cl.
USPC .................................................. 370/238

(58) Field of Classification Search .................. 370/237, 370/238
See application file for complete search history.

(56) References Cited

U.S. PATENT DOCUMENTS

| | | | |
|---|---|---|---|
| 6,363,319 B1 * | 3/2002 | Hsu | 701/533 |
| 7,274,869 B1 * | 9/2007 | Pan | 398/5 |
| 7,283,477 B1 * | 10/2007 | Fedyk et al. | 370/237 |
| 2002/0145982 A1 * | 10/2002 | Talpade et al. | 370/253 |
| 2004/0008688 A1 * | 1/2004 | Matsubara et al. | 370/395.21 |
| 2004/0028054 A1 * | 2/2004 | Khurana et al. | 370/395.21 |
| 2004/0203820 A1 * | 10/2004 | Billhartz | 455/452.1 |
| 2007/0177594 A1 * | 8/2007 | Kompella | 370/390 |
| 2008/0056137 A1 * | 3/2008 | Ravindran et al. | 370/238 |

* cited by examiner

*Primary Examiner* — Mark Rinehart
*Assistant Examiner* — Peter Cheng
(74) *Attorney, Agent, or Firm* — Schwegman, Lundberg & Woessner, P.A.

(57) ABSTRACT

In one embodiment, a method for routing data flow during ECMP routing between two network nodes is provided. The method may comprise determining a bandwidth requirement of a data flow during ECMP routing, the data flow to be sent between at least two network nodes, the at least two network nodes communicating via a plurality of data paths. The method may further comprise determining the available bandwidth on each of the plurality of data paths and selecting the data path having sufficient bandwidth to accommodate the bandwidth of the data flow.

18 Claims, 7 Drawing Sheets

| | STATUS | DATA TYPE | BANDWIDTH CAPABILITY | BANDWIDTH BEING CARRIED |
|---|---|---|---|---|
| ROUTING DATA TABLE | | | | |
| PATH 16.1 | | | | |
| PATH 16.2 | | | | |
| PATH 16.n | | | | |
| 80 | 82 | 84 | 86 | 88 |

BANDWIDTH BASED SELECTION FOR ROUTING DATA

FIELD

The present disclosure relates generally to selecting a path for a data flow based on the data flow's bandwidth and, in an example embodiment, selecting a data path during ECMP (equal-cost multi-path) routing between at least two network nodes, e.g., routers.

BACKGROUND

Data communications networks utilizing ECMP routing are relatively common. When network nodes, such as routers, need to split data flows (e.g. IP (Internet Protocol) multicast data traffic or mLDP traffic) across the data paths between them during ECMP routing, various routing protocols may be used. These may include a simple hash mechanism that can calculate a hash value based on an identifier for each multicast data flow, with modulo arithmetic then being used to select which one of the data paths between the network nodes is to carry the multicast data flows. This stochastical splitting of data flows across the available data paths during ECMP routing may work well if there are many data flows that need to be transmitted, with each data flow having a relatively small bandwidth. In this case, on average, the spread of data flows being transmitted may be relatively even across the available ECMP data paths.

In applications where high bandwidth data flows need to be transmitted (e.g. IPTV data flows having bandwidths of between 4 Mbps and 20 Mbps), stochastically splitting the data flows across all available data paths may not be viable and may also not be the most efficient way of transmitting the data flows across the network.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

Overview

A method for routing data flow during ECMP routing between two network nodes is provided. The method may comprise determining a bandwidth requirement of a data flow during ECMP routing, the data flow to be sent between at least two network nodes, the at least two network nodes communicating via a plurality of data paths. The method may further comprise determining the available bandwidth on each of the plurality of data paths and selecting the data path having sufficient bandwidth to accommodate the bandwidth of the data flow.

Example Embodiments

Figure 1:
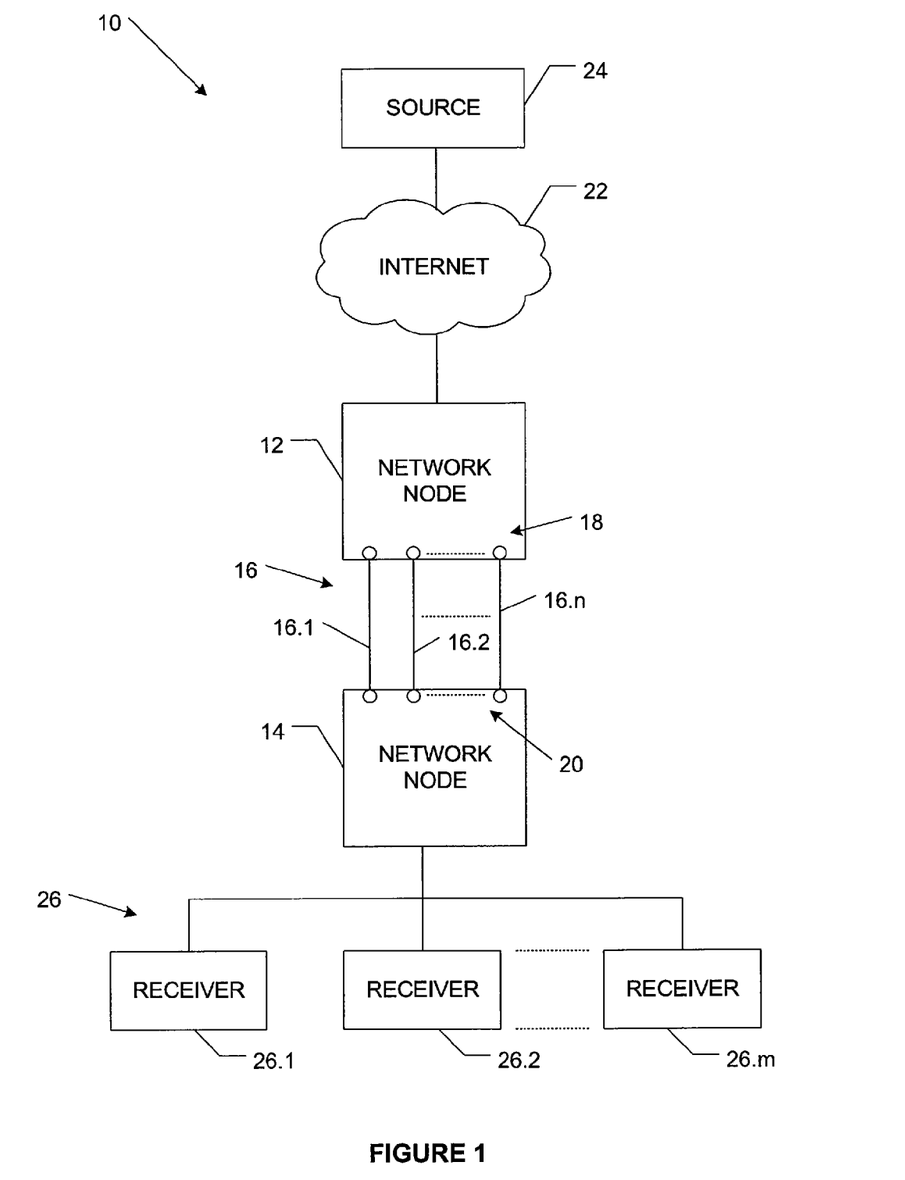
FIG. 1 shows an example of a system, in accordance with an example embodiment, to route data flow during ECMP routing between two network nodes, based on the available bandwidth of the ECMP data paths.

Referring to FIG. 1, reference numeral 10 generally indicates a system, in accordance with an example embodiment, to route data flow between two network nodes during ECMP (equal-cost multi-path) routing. As will be described in more detail below, the selection of a data path connecting the two network nodes is based on the available bandwidth of the ECMP data paths.

In an example embodiment, the system 10 comprises two network nodes 12, 14 connected via a plurality of data paths links 16.1, 16.2 . . . 16.n (e.g., G bps Ethernet links). In an example embodiment, the plurality of data paths 16.1, 16.2 . . . 16.n may form a link bundle comprising multiple data links (e.g., 16.1, 16.2 . . . 16.n), with each data link being able to carry a data flow between the network nodes 12, 14. The network nodes 12, 14 may comprise a network router or switch.

ECMP is typically used within networks when a load-split of traffic, e.g., IP multicast or unicast data, is required to achieve a high utilization of all data paths or links.

Multicast is the delivery of information to a group of destinations simultaneously using efficient strategies to deliver data flows over each path in a network only once. When IP multicast traffic is being routed, network nodes, e.g., routers, may create optimal spanning tree distribution paths for data flow sent to a multicast destination address in real-time. Multicast transmissions may for example be used in applications of IPTV where broadcast video is transmitted to a number of destinations, e.g., receivers. Unicast transmissions may for example be used when video on demand data flow is transmitted to one particular destination or receiver.

As shown in FIG. 1, each network node 12, 14 may comprise an interface 18, 20, respectively, to interface with the at least one data path 16.1 . . . 16.n.

In ECMP routing more than one data path or link 16.1 . . . 16.n is substantially equally capable of carrying a data flow or a data packet of a data flow between the network nodes 12, 14.

In an example embodiment, the network node 12 may function as an upstream network node, with the network node 12 being connected, via the Internet 22, to a source 24 of the data flow to be sent between the network nodes 12, 14. For example, the source 24 of the data flow may, in an example embodiment, be a content provider of broadcast video or IPTV content, e.g., a cable company or digital satellite company.

The network node 14 may in turn define a downstream network node, which may be connected to at least one receiver 26 which may comprise receivers 26.1 . . . 26.*m*, to receive the data flow. In an example embodiment, the receivers 26.1 . . . 26.*m* may be set-top boxes located in homes throughout a residential neighborhood.

In an example embodiment, the data flow is a multicast transmission, for example a PIM IPv4 multicast, a IPv6 multicast or a mLDP multicast. In IP multicasting, the source 24 may specify a destination IP address that may comprise a multicast group address for the at least one receiver 26.1 . . . 26.*m* that is to receive the data flow. The IPv4 and IPv6 addresses may be subdivided into different prefixes, one of which may be designated for use by IP multicast.

To create optimal spanning tree data paths during ECMP multicasting, receivers 26.1 . . . 26.*m* may notify their desire to receive particular data flows destined for the IP multicast group address, and this may be done by sending a multicast reception request or join to the source 24 of the data flow, along a selected data path 16. The source specific multicast reception request that is sent from the receiver 26 towards the source 24 may use the source address to look up a routing data table entry, router by router, until the source 24 is reached. The source 24 may then send the requested data flow towards the direction the original multicast reception request came from. This process is called reverse path forwarding (RPF).

Figure 2:
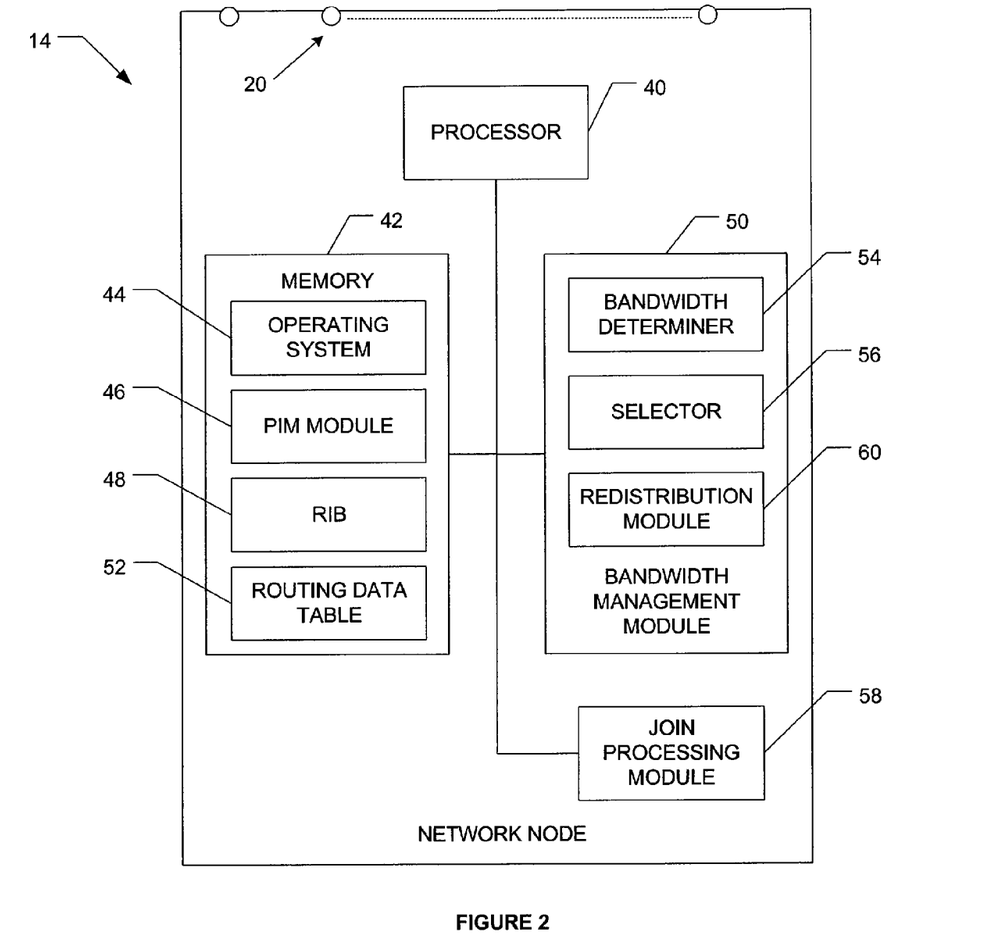
FIG. 2 shows a more detailed schematic diagram of a downstream network node in the form of a router, in accordance with an example embodiment, that may be used in the system shown in FIG. 1.

In an example embodiment, with reference now to FIG. 2, the downstream network node 14 is a router. In this instance, the router is configured as a multicast router that may be used in conjunction with an example embodiment of the disclosure.

The network node 14 comprises at least one processor 40 connected to a plurality of interfaces 20 that input (Rx) and output (Tx) messages as part of data flows. The interfaces 20 may be joined by an interconnect fabric (not shown) such as, e.g., a crossbar interconnection switch or high-speed bus. Those skilled in the art will recognize that other router platforms such as, e.g., a uniprocessor system or a plurality of independent nodes interconnected via a communications fabric as a multi-node cluster, could be used in accordance with the invention. In this context, the term "node" denotes a computer or processor complex comprising processors and an independent memory shared by the processors.

The processor 40 may have a dedicated memory 42. The memory 42 may comprise storage locations addressable by the processor 40 for storing software programs and data structures. The processor 40 may comprise processing elements or logic for executing the software programs and manipulating the data structures.

An operating system 44, portions of which may be resident in memory 42 and executed by the processor 40, may functionally organize the network node 14 by, inter alia, invoking network operations in support of software processes executing on the processors. These software processes may include amongst others Protocol Independent Multicast (PIM) module 46, Routing Information Base (RIB) 48 and a bandwidth management module 50. It will be apparent to those skilled in the art that other processor and memory means, including various computer readable media, may be used for storing and executing program instructions pertaining to the inventive technique described herein.

The PIM module 46 may rely on an underlying topology-gathering protocol to populate a routing table 52 of a RIB 48 to establish and maintain paths or routes. As used herein, a path may comprise, inter alia, a combination of a set of path attributes and a prefix. The paths in the RIB table may be provided directly from the routing table or by separate routing protocols, such as the Border Gateway Protocol version 4 (BGP4), Multi-Protocol Extensions to BGP4 (MBGP) and a routing protocol as implemented by the bandwidth management module 50.

The bandwidth management module 50 may be controlled, in an example embodiment, by the processor 40, with the bandwidth management module 50 comprising a bandwidth determiner 54 and a selector 56.

The bandwidth determiner 54 may determine a required bandwidth of a data flow to be sent between the two data network nodes 12, 14. As will be described below, the bandwidth determiner 54 may determine the required bandwidth by accessing a routing data structure. The bandwidth determiner 54 may also be arranged to determine the bandwidth available on each of the plurality of data paths 16.1 . . . 16.*n*. The bandwidth determiner 54 may accordingly track the total assigned bandwidth that is being used for each of the uplink interfaces 20 by accessing the routing data table 52, with the bandwidth values being stored in the routing table 52.

Based on the information stored in the routing data table 52 and the information obtained by the bandwidth determiner 54, the selector 56 may select an appropriate data path 16.1 . . . 16.*n* having sufficient bandwidth to accommodate the bandwidth of the data flow, so that, in an example embodiment, each data path 16.1 . . . 16.*n* may carry substantially the same bandwidth of data traffic. For example, the selector 52 may select one of the plurality of data paths 16.1 . . . 16.*n* based on the particular data path having the most bandwidth available.

Thus, the downstream network node 14 may, for a whole multicast flow, decide which interface 20, corresponding to the selected data path 16.1 . . . 16.*n* towards the source 24, to send the multicast reception request to. The data flow may then be transmitted from the source 24, in the reverse direction, along this established path. The downstream network node 14 may thus select a RPF (Reverse Path Forwarding) interface 20 for which the remaining free bandwidth is the highest, so as to achieve bandwidth based load distribution across the data paths 16.1 . . . 16.*n*. All data paths 16.1 . . . 16.*n* may thus, as much as possible, have the same bandwidth, and this may be achieved by modifying the configuration of the downstream network node 14 so that the RPF selection follows the disclosed configuration.

In an example embodiment, the downstream network node 14 may comprise a multicast reception request or join processing module 58 to receive and process a multicast reception request or join from one of the receivers 26.1 . . . 26.*m* for a particular multicast data flow. The join processing module 58 may then generate and transmit a new multicast reception request up to one of its outbound interfaces 20.

As mentioned, the downstream network node 14 may determine, after accessing the routing table 52, that there is more than one data path 16 available and capable of carrying the requested data flow, and may then rely on the bandwidth management module 50, in combination with other modules of the network node 14 to select an appropriate data path 16.1 . . . to 16.*n* to carry the data flow. Once the bandwidth management module 50 has determined which data path to use, the processor 40 may update the routing data table 52 accordingly. It will be appreciated that the join processing module 58 may be a separate module or may, alternatively form part of the memory 42 or form part of the bandwidth management module 40.

As mentioned the PIM module 46 may rely on an underlying topology-gathering protocol to populate a routing data table 52 of a RIB 48 to establish and maintain paths or routes. The PIM module 46 may accordingly monitor the number of data paths 16.1 . . . to 16.n and may flag a particular data path in the event that the data path fails or alternatively, may add a new data path, in the event that a new data path is incorporated into the network topology. The PIM module 46 is also responsible for monitoring the status of each data path and updating the routing data table 52 with this status information.

The bandwidth management module 50 may, in these circumstances, include a redistribution module 60 to dynamically redistribute the data flows across the updated paths 16.1 . . . 16.n having sufficient bandwidth to carry the data in an example embodiment.

Figure 3:
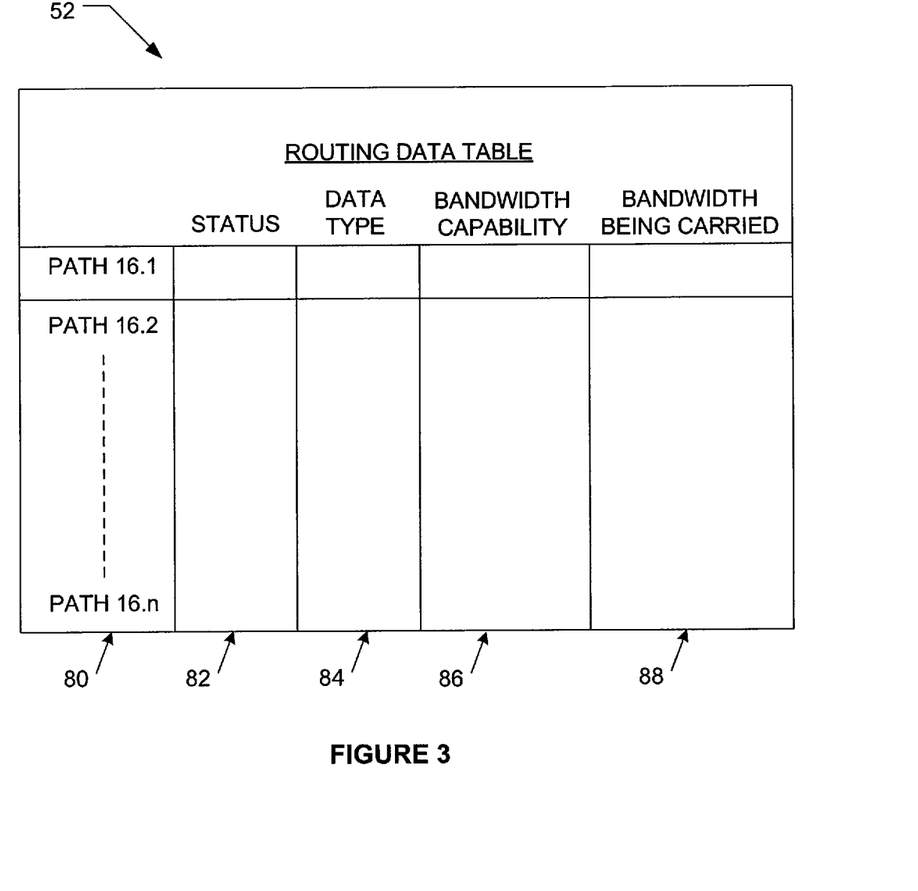
FIG. 3 shows an example of a data routing table that may be maintained within a memory of the network node of FIG. 2 for the ECMP data paths, in accordance with an example embodiment.

Turning now to FIG. 3, a routing data table 52 according to an example embodiment is shown. The routing data table 52 may be maintained in the memory 42 of the network node 14. The routing data table 52 may comprise a list 80 of the data paths 16.1 . . . 16.n to which the downstream network node 14 may be connected. The routing data table 52 may further comprise a status for each of the data paths 82, a list of the types of data flows 84 that may be carried by each path 16.1 . . . 16.n, a list of the bandwidth carrying capabilities 86 of each of the paths 16.1 . . . 16.n and a list of the bandwidth 88 currently being carried by each path 16.1 . . . 16.n. Thus, in an example embodiment, the routing data table 52 comprises a pre-assigned arrangement of bandwidths for each one of the plurality of data paths 16.1 . . . 16.n, and the routing data structure accessible to the selector 56, thereby to enable the selector to select the path 16.1 . . . 16.n having sufficient or the most bandwidth available to accommodate the bandwidth of the data flow.

When the selector 56 has selected the path 16.1 . . . 16.n to carry the data flow, the processor 40 may record this information in the routing data table 52 by changing the entry for the relevant data path 16.1 . . . 16.n to reflect the bandwidth that is to be carried.

In an example embodiment, the routing data table 52 may be statically configured so that, in use, if a user wants to create a new multicast flow, the user may simply need to select an appropriate path 16.1 . . . 16.n for the user's purposes.

In an example embodiment, the network components may rely upon a multicast group address to ensure that the data packets of the data flow are transmitted to the correct multicast receivers 26.1 . . . 26.m. For example, the multicast group address may be an IP (Internet Protocol) address comprising four numbers of eight bits each, e.g., 232.x.y.z. The first number may indicate a particular type of multicast flow (e.g. TV data) which may have data bandwidths in the range 4 Mbps to 20 Mbps. This data type, may, for example, be reflected in column 84 of the routing data table 52. Thus, in an example embodiment, there may be roughly 18 different bandwidths, with an IP address of, for example, 232.5.y.z denoting a multicast group address that in the network node 12, 14 is configured to carry 5 Mbps of bandwidth. Similarly, an IP address of 232.6.y.z may be used to denote a multicast group address that in the network node 12, 14 is configured to carry 6 Mbps of bandwidth. It follows that, in this simple addressing embodiment, the required bandwidth (in Mbps) of the data flow may be inserted into the second number of the receiver group IP address, which may then be statically configured in the respective routing data tables of all the network nodes 12, 14.

As mentioned, in an example embodiment, the network nodes may be used to implement a SSM (Source Specific Multicast) methodology. Thus, a source (S), for example source 24 in FIG. 1, and a group (G) of multicast receivers (e.g., receivers 26.1 . . . 26.n) may be defined using the notation (S, G) with each unique (S, G) identifying a multicast flow between the source 24 and the group of multicast receivers 26. In use, when an RPF-lookup for an (S, G) is done, and the associated RPF interfaces 20 are known, the downstream network node 14 may make another call to determine whether there is a bandwidth known for the (S, G) channel. If no bandwidth is known, then a conventional per—(S,G) load splitting technique may be executed. If a bandwidth is known, then the downstream network node 14, e.g., the bandwidth management module 50, may poll the RPF interfaces 20 and determine the limiters on each interface 20 to which the (S,G) may be matched. From this RPF-selection process, the interface 20 with the largest available bandwidth may be determined. If all limiters are exhausted, then a Null interface may be returned. If any interface does not have a limiter set up for the (S, G) channel (e.g. it maps to no limit), then the relevant interface may be ignored. If none of the interfaces match the (S, G) to a limiter, then the conventional per—(S,G) load splitting technique may again be carried out.

In an example embodiment, the data flow may be part of a unicast transmission. In this configuration, the upstream network node or router 12 may comprise the bandwidth management module 50 comprising the bandwidth determiner 54, the selector 56 and the redistribution module 60. Similar to other network nodes and routers, the upstream network node 12 may also comprise the processor 40 and a memory 42 with submodules as described above, with reference to FIG. 2. However, the upstream network node 12 need not include a join processing module 38, as unicast transmissions do not rely on reverse path forwarding. In unicast transmissions (e.g. video on demand applications), data packets forming part of a data flow may be transferred from a single source 24 to a single receiver 26. It may therefore be the upstream network node's responsibility to obtain the data flow and to select the appropriate data path 16.1 . . . 16.n to send the data packets of the data flow to the receiver 28 via the downstream network node 14.

Figure 4:
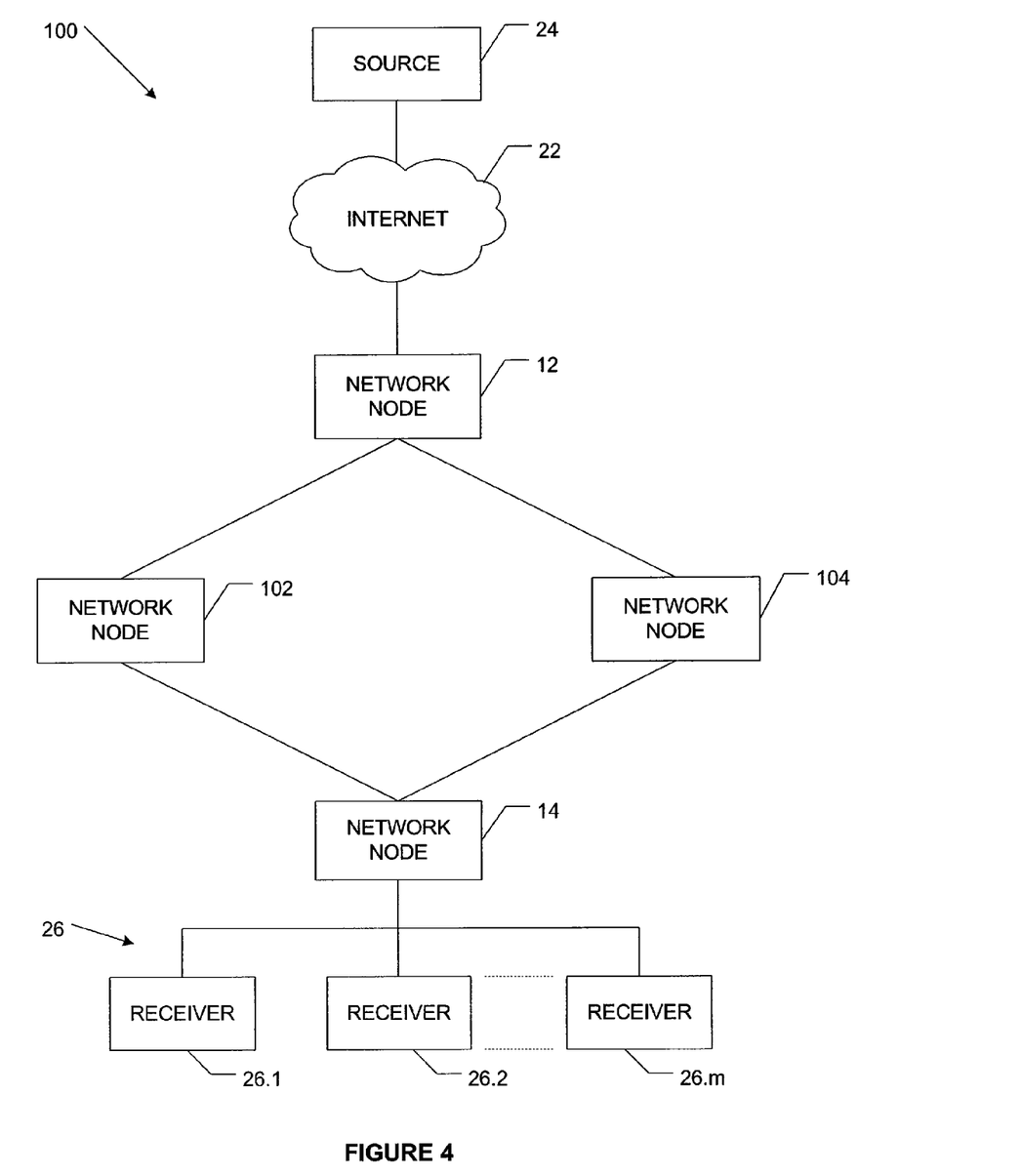
FIG. 4 shows a system, in accordance with a further example embodiment, to route data flow during ECMP routing between network nodes, based on available bandwidth of the data paths connecting the network nodes, in accordance with an example embodiment.

The system 10 described by way of example above with reference to FIG. 1 is a relatively simple configuration to illustrate the features of the disclosure. A different example embodiment of a system 100 is shown in FIG. 4, in which a plurality of intermediate network nodes 102, 104 are located between two extreme network nodes 12, 14. Thus, the network node 12 of FIG. 4 may correspond to the upstream network node 12 of FIG. 1, and network node 14 of FIG. 4 may correspond to downstream network node 14 of FIG. 1 so as to define a network tree for carrying data packets. The network nodes 12, 14, 102 and 104 may utilize routing protocols to route data packets of data flows through the system 100. In an example embodiment, multicast ECMP routing protocols construct distribution trees through the network and direct multicast forwarding, as described above. The multicast distribution trees define the path that multicast traffic may take through the network to group members.

As previously described, in example embodiments, mLDP multicast and IP multicast may utilize receiver side explicit multicast reception request (or join) based tree building protocols that are driven by downstream network components sending multicast reception requests upstream.

Figure 5:
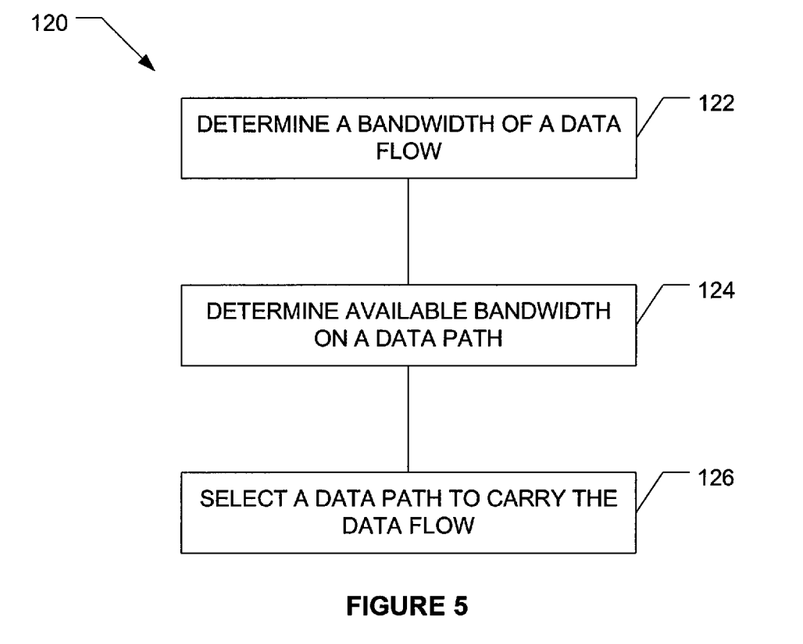
FIG. 5 shows a flow diagram of an example method for selecting a data path during ECMP routing of data flows, in accordance with an example embodiment.

FIG. 5 shows a flow diagram of a method 120, in accordance with an example embodiment, for selecting a data path to carry a data packet of a data flow between at least two network nodes, e.g., routers. In one example embodiment, the method may be implemented by the system 10 of FIG. 1 or the system 100 of FIG. 4.

As shown by block 122, a bandwidth determiner 54 of a bandwidth management module 50 may determine a bandwidth requirement of a data flow during ECMP routing. The data flow of which the bandwidth requirement is to be determined is to be sent between at least two network nodes 12 and 14 which communicate with each other via a plurality of data paths 16.1 ... 16.n.

The available bandwidth of each of the plurality of data paths may be determined by the bandwidth determiner 54 (indicated by block 124) by accessing the routing data table 52, in order for a selector 56 of the bandwidth management module 50 to select a data path having sufficient bandwidth to accommodate the bandwidth of the data flow to be transmitted (indicated by block 126).

In an example embodiment, the operations set out in blocks 122 to 126 may be performed by the downstream network component 14, so as to implement a bandwidth based load distribution for the data flow to be received by the downstream network component. The downstream network component 14 may perform the functionality during multicast routing where reverse path forwarding is used.

In a different example embodiment, the operations set out in blocks 122 to 126 may be performed by the upstream network component 12, so as to implement a bandwidth based load distribution where unicast routing is used.

Figure 6:
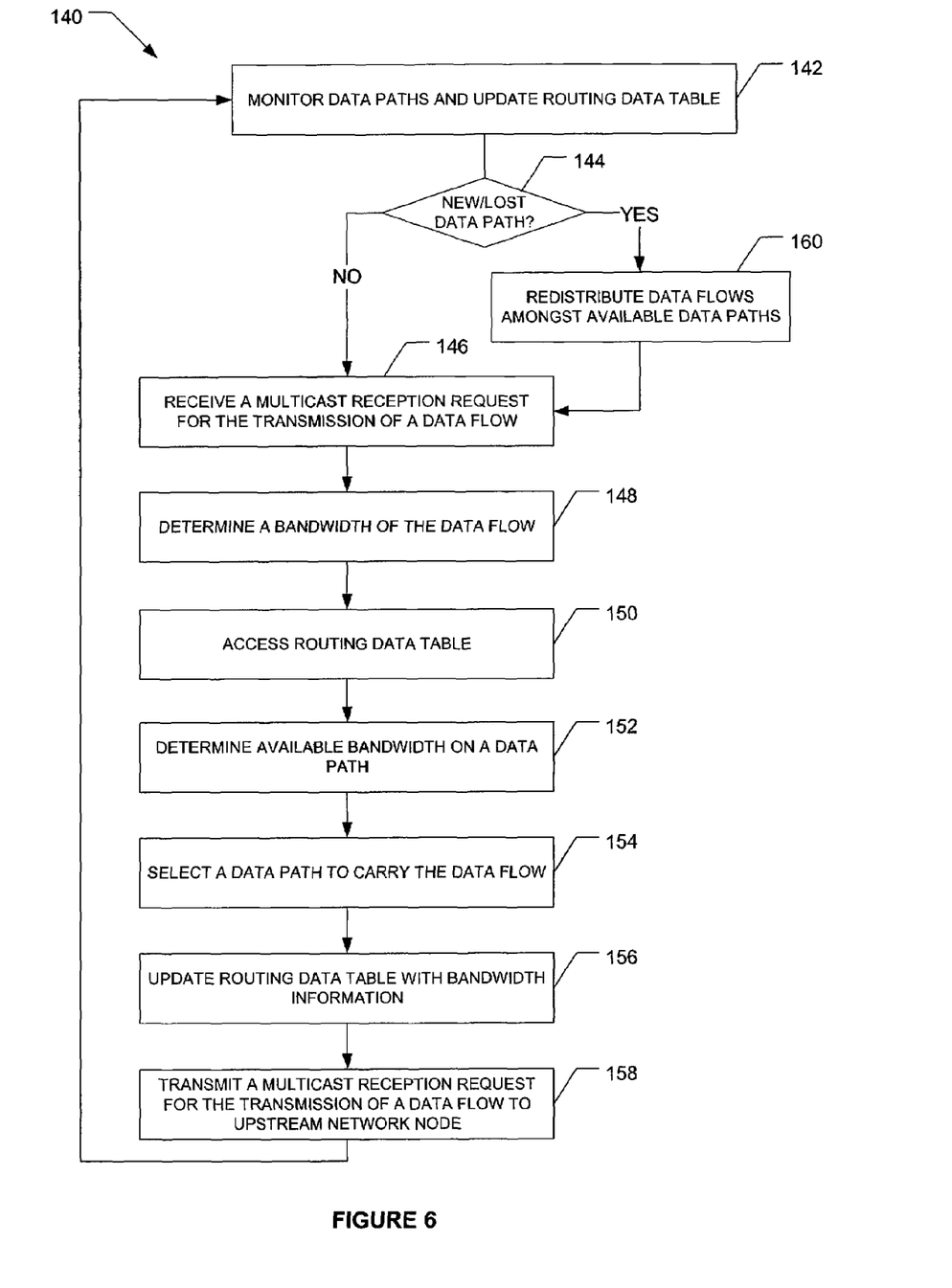
FIG. 6 shows a flow diagram of an example method for selecting a data path during multicast ECMP routing of data flows, in accordance with an example embodiment.
Figure 7:
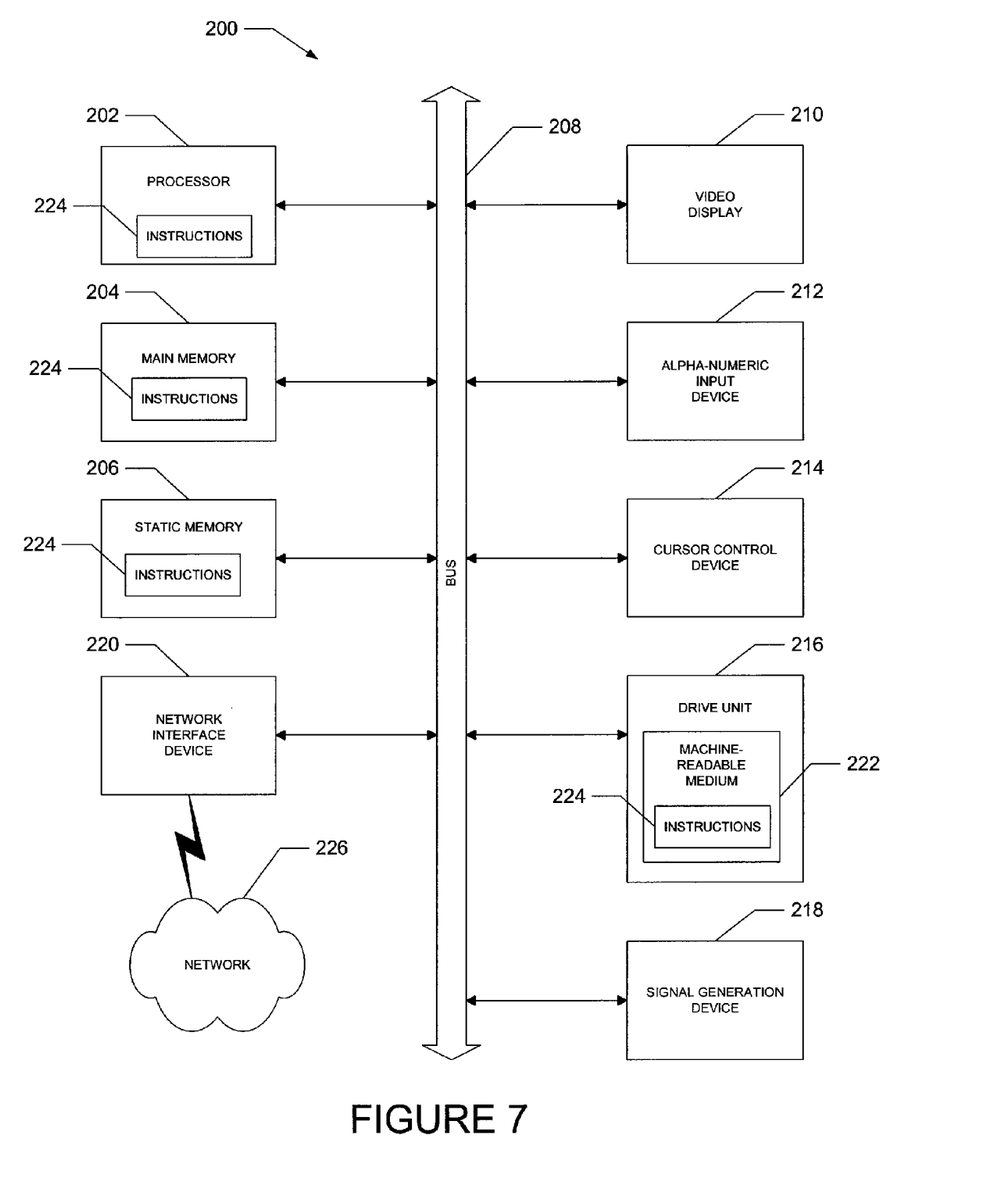
FIG. 7 shows a diagrammatic representation of machine in the example form of a computer system within which a set of instructions, for causing the machine to perform any one or more of the methodologies discussed herein, may be executed.

FIG. 6 shows a flow diagram of a more detailed example method 140 for selecting a data path during multicast ECMP routing of data flows, in accordance with an example embodiment. In an example embodiment, the method 140 may be implemented by the system 10 of FIG. 1 or the system 100 of FIG. 4.

As shown by block 142, a PIM module 46 on a network node 14, may monitor data paths interfaced with the network node 14 and may update a routing data table 52 to establish and maintain paths or routes.

In one example embodiment, in the event that the PIM module 46 determines that no new data path has been added to the interface of the network node 14, or in the event that no data path has been lost (block 144), the normal operation of the network node 14 may continue.

An interface 20 of the network node 14 may receive a multicast reception request or join from one of a plurality of receivers 26.1 ... 26.m, requesting the transmission of a particular data flow (see block 146). This is in accordance with reverse path forwarding (RPF) routing.

As shown by block 148, a bandwidth determiner 54 may now determine a bandwidth requirement of the data flow during ECMP routing. The data flow of which the bandwidth requirement is to be determined has been requested with the multicast reception request and may be transmitted between at least the two network nodes 12 and 14 which communicates with each other via a plurality of data paths 16.1 ... 16.n. The required bandwidth may, in an example embodiment, be determined by accessing the routing data protocol of the multicast reception request.

The bandwidth determiner 54 of the bandwidth management module 50 may access a routing data table 52 (see block 150) and may determine the available bandwidth of each of the plurality of data paths (see block 152). This enables a selector 56 of the bandwidth management module 50 to select a data path that has sufficient bandwidth to accommodate the bandwidth of the data flow to be transmitted (see block 126) and in an example embodiment to select a data path with the most available bandwidth.

Once the selection of a data path has been made, the processor 40 may update the routing data table 52 with the updated bandwidth information for the respective data path (see block 156).

In block 158, the processor 40 arranges for the interface of the selected data path to transmit a multicast reception request to the upstream network node 12, thereby to forward the initial request received from the receiver and to establish an optimal spanning tree distribution path for the transmission of the requested dataflow.

In the event that the PIM module 46 determined that a new data path has been added to the interface of the network node 14, or that a data path has been lost (block 144), a redistribution module 60 of the bandwidth management module 50 may dynamically redistribute data flows amongst the available data paths in accordance with load-sharing principles.

FIG. 6 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 304 and a static memory 306, which communicate with each other via a bus 208. The computer system 300 may further include a video display unit 210 (e.g., a plasma display, a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising, at a network node:
   receiving from a requesting device an inbound multicast reception request for transmission of a multicast data flow to the requesting device via the network node, the requesting device being downstream of the network node for the multicast data flow;
   determining a bandwidth requirement of a the multicast data flow during equal-cost multi-path (ECMP) routing, the multicast data flow to be received by the network node from an upstream network node at one of a plurality of data path links at the network node, the upstream network node being upstream of the network node for the multicast data flow;
   determining respective bandwidth available for the multicast data flow via each of the plurality of data path links, and storing data indicative of the available bandwidth via each of the plurality of data path links in a memory;
   identifying from the plurality of data path links two or more candidate data path links, each candidate data path link individually satisfying the bandwidth requirement of the multicast data flow;
   using one or more processors, selecting a particular one of the two or more candidate data path links for reception of the multicast data flow, the particular data path link being selected based at least in part on the respective available bandwidth via each of the plurality of data path links; and
   communicating to the upstream network node the selection of the particular data path link for reception of the multicast data flow, to indicate that the upstream network node is to send the multicast data flow to the network node along only a particular data path, the particular data path corresponding to the particular data path link.

2. The method of claim 1, wherein selecting the particular data path link further comprises selecting the data path link with the most bandwidth available.

3. The method of claim 1, wherein the communicating to the upstream network node of the selection of the particular data path link comprises sending a multicast reception request to the upstream network node via the particular data path link, to include the particular data path in a multicast distribution tree during reverse path tree building for the multicast data flow.

4. The method of claim 1, wherein selecting the particular data path link having sufficient bandwidth is performed based on a pre-assigned arrangement of bandwidth for each of the plurality of data path links.

5. A system comprising:
   at least two network nodes comprising an upstream network node and a downstream network node that is downstream of the upstream network node for a multicast data flow;
   a multicast reception request processing module at the downstream network node to receive from a requesting node an inbound multicast reception request for transmission of the multicast data flow to the requesting node via the downstream network node, the requesting node being downstream of the downstream network node for the multicast data flow;
   a plurality of data paths extending between the at least two network nodes, the multicast data flow during equal-cost multi-path (ECMP) routing to be sent from the upstream network node to the downstream network node via one of the plurality of data paths;
   at the downstream network node, a plurality of data path links that connect the downstream network node to the plurality of data paths;
   a bandwidth determiner at the downstream network node to
      determine a required bandwidth of the multicast data flow,
      determine bandwidth respectively available for the multicast data flow via each of the plurality of data path links, and
      store bandwidth data indicative of the available bandwidth associated with each of the plurality of data links in a memory on the downstream network node; and
   a selector at the downstream network node to
      select, based at least in part on the bandwidth data, a particular data path link for reception of the multicast data flow from the upstream network node, the particular data path link being selected from or more of the plurality of data path links having sufficient available bandwidth to accommodate the bandwidth of the multicast data flow, and
      communicate to the upstream network node the selection of a particular data path by which the upstream network node is to send the multicast data flow to the downstream network node, the particular data path corresponding to the particular data path link.

6. The system of claim 5, wherein the selector is to select the data path link with the most bandwidth available.

7. The system of claim 5, wherein the multicast reception request processing module is configured to transmit an outbound multicast reception request to the upstream network node along the particular data path to communicate selection of the particular data path to the upstream network node.

8. The system of claim 5, comprising a routing data structure a pre-assigned arrangement of bandwidths associated with each of the plurality of data path links, the routing data structure being accessible to enable the selection of the particular data path link through which sufficient bandwidth is available to satisfy the bandwidth requirement of the multicast data flow.

9. The system of claim 5, comprising a Protocol Independent Multicast (PIM) module to monitor the number of data path links that have sufficient associated bandwidth to carry the multicast data flow and to update a routing data table with the bandwidth being carried by each one of the plurality of data path links.

10. A device comprising:
an interface comprising a plurality of data path links to couple the device with a plurality of data paths capable of carrying data flows from an upstream network node to the device during equal-cost multi-path (ECMP) routing, so that the device is a downstream network node relative to the upstream network node for the data flows;
a multicast reception request processing module to receive from a requesting node an inbound multicast reception request for transmission of a multicast data flow to the requesting node via the device, the requesting node being downstream of the device for the multicast data flow;
a bandwidth determiner
to determine a required bandwidth of the multicast data flow to be carried from, and
to determine bandwidth available for the multicast data flow via each of the plurality of data path links;
a memory to store bandwidth data indicative of the available bandwidth via each of the plurality of data path links; and
a selector to select, based at least in part on the bandwidth data, a particular data path link from two or more of the plurality of data path links that have sufficient bandwidth to accommodate the bandwidth of the multicast data flow, and to communicate to the upstream network node selection of a particular data path by which the upstream network node is to send the multicast data flow to the device, the particular data path corresponding to the particular data path link.

11. The device of claim 10, wherein the selector is to select the data path link with the most bandwidth available.

12. The device of claim 10, wherein the multicast reception request processing module is configured to transmit an outbound multicast reception request to the upstream network node via the particular data path link and along the particular data path, to communicate to the upstream network node selection of the particular data path as an exclusive path for transmission of the multicast data flow from the upstream network node to the device.

13. The device of claim 10, comprising a routing data structure including a pre-assigned arrangement of bandwidths for each of the plurality of data path links, the routing data structure being accessible to enable the selection of the particular data path link having sufficient bandwidth to accommodate the bandwidth of the multicast data flow.

14. The device of claim 10, wherein the device comprises a Protocol Independent Multicast (PIM) module to monitor the number of data paths that have sufficient bandwidth to carry the multicast data flow, and to update a routing data table with the bandwidth being carried by each one of the plurality of data paths.

15. The device of claim 14, wherein the PIM module is to flag a data path which fails.

16. The device of claim 15, further including a redistribution module to dynamically redistribute data flows, in response to a data path being flagged, across the plurality of data paths to accommodate the bandwidth of the multicast data flow.

17. The device of claim 14, wherein the PIM module is to add a new data path to the routing data table whenever a new data path is detected as being connected to the interface.

18. The device of claim 17, further including a redistribution module to dynamically redistribute data flows, in response to a new data path being added to the routing data table, across the plurality of data to accommodate the bandwidth of the multicast data flow.

* * * * *

UNITED STATES PATENT AND TRADEMARK OFFICE
CERTIFICATE OF CORRECTION

PATENT NO. : 8,427,959 B2  
APPLICATION NO. : 11/625552  
DATED : April 23, 2013  
INVENTOR(S) : Alvarez et al.

Page 1 of 1

It is certified that error appears in the above-identified patent and that said Letters Patent is hereby corrected as shown below:

In the Claims

In column 10, line 49, in Claim 5, after "from", insert --two--

In column 10, line 66, in Claim 8, before "a", insert --including--

Signed and Sealed this  
Twenty-seventh Day of August, 2013

Teresa Stanek Rea  
*Acting Director of the United States Patent and Trademark Office*